(12) United States Patent
Rhodes

(10) Patent No.: US 7,791,663 B2
(45) Date of Patent: Sep. 7, 2010

(54) IMAGE SENSOR AND PIXEL THAT HAS POSITIVE TRANSFER GATE VOLTAGE DURING INTEGRATION PERIOD

(75) Inventor: Howard E. Rhodes, Boise, ID (US)

(73) Assignee: OmniVision Technologies, Inc., Santa Clara, CA (US)

( * ) Notice: Subject to any disclaimer, the term of this patent is extended or adjusted under 35 U.S.C. 154(b) by 1305 days.

(21) Appl. No.: 10/966,137

(22) Filed: Oct. 15, 2004

(65) Prior Publication Data

US 2006/0082667 A1  Apr. 20, 2006

(51) Int. Cl.
*H04N 3/14* (2006.01)
*G03B 7/00* (2006.01)

(52) U.S. Cl. .................. 348/297; 348/362
(58) Field of Classification Search .......... 348/216, 348/243, 308, 216.1, 296–297, 362; 250/208.1; 257/291–292
See application file for complete search history.

(56) References Cited

U.S. PATENT DOCUMENTS

| | | | | |
|---|---|---|---|---|
| 6,166,768 | A * | 12/2000 | Fossum et al. | 348/308 |
| 6,201,270 | B1 * | 3/2001 | Chen | 257/292 |
| 6,211,510 | B1 * | 4/2001 | Merrill et al. | 250/208.1 |
| 6,326,230 | B1 * | 12/2001 | Pain et al. | 438/57 |
| 6,600,471 | B2 * | 7/2003 | Lee et al. | 345/90 |
| 6,777,662 | B2 * | 8/2004 | Drowley et al. | 250/208.1 |
| 6,847,070 | B2 * | 1/2005 | Fox | 257/291 |
| 6,888,122 | B2 * | 5/2005 | Fossum | 250/208.1 |
| 7,095,440 | B2 * | 8/2006 | Fossum | 348/308 |
| 7,141,841 | B2 * | 11/2006 | Mouli | 257/291 |
| 7,193,198 | B2 * | 3/2007 | Dai | 348/308 |
| 7,247,898 | B2 * | 7/2007 | Dosluoglu | 257/292 |
| 7,489,355 | B2 * | 2/2009 | Lee et al. | 348/308 |
| 2005/0083421 | A1 * | 4/2005 | Berezin et al. | 348/308 |

FOREIGN PATENT DOCUMENTS

| | | |
|---|---|---|
| EP | 1223623 | 7/2002 |
| EP | 1580987 | 8/2005 |
| WO | WO-03050874 | 6/2003 |
| WO | WO-2004062274 | 7/2004 |

OTHER PUBLICATIONS

European Search Report for European Application No. EP 05 25 6407 dated Dec. 12, 2005; Applicant: OmniVision Technologies, Inc,; 6 pages.

* cited by examiner

*Primary Examiner*—David L Ometz
*Assistant Examiner*—Trung Diep
(74) *Attorney, Agent, or Firm*—Blakely Sokoloff Taylor & Zafman LLP

(57) ABSTRACT

A pixel and image sensor formed in accordance with the present invention has two modes of operation: a normal mode and a low light mode. The present invention switches from a normal to a low light mode based upon the amount of illumination on the image sensor. Once the level of illumination is determined, a decision is made by comparing the level of illumination to a threshold whether to operate in normal mode or low light mode. In low light mode, the reset transistor (for a 3T pixel) or the transfer transistor (for a 4T pixel) is biased positive.

13 Claims, 4 Drawing Sheets

IMAGE SENSOR AND PIXEL THAT HAS POSITIVE TRANSFER GATE VOLTAGE DURING INTEGRATION PERIOD

TECHNICAL FIELD

The present invention relates to image sensors, and more particularly, to an image sensor that uses pixels that maintain a positive transfer gate (or reset gate for 3T pixel) voltage during the photodiode integration period under low light conditions.

BACKGROUND

Image sensors have become ubiquitous. They are widely used in digital still cameras, cellular phones, security cameras, medical, automobiles, and other applications. The technology used to manufacture image sensors, and in particular CMOS image sensors, has continued to advance at great pace. For example, the demands of higher resolution and lower power consumption have encouraged the further miniaturization and integration of the image sensor.

For image sensors, it is a constant challenge to limit "hot pixels", i.e. those pixels that output a signal even when there is no incident light. The hot pixel problem is particularly exacerbated during long integration periods (i.e. long exposure times). The hot pixel problem is closely related to dark current. As will be described further below, in the case of a four transistor (4T) pixel design, it is believed that the region beneath the transfer gate of the transfer transistor is a primary source of dark current.

One method to limit dark current is to apply a negative potential to the transfer gate. If the potential of the transfer gate is held negative, holes will accumulate under the transfer gate. This quenches electron generation which substantially reduces dark current and hot pixel effects. However, the application of a negative potential to the transfer gate results in reduced anti-blooming performance. At negative potential, the transfer gate is shut off completely. If there is a bright source of light incident on any of the pixels of the imaging array, then the generated photocharge on those pixels cannot spill over the transfer gate onto the floating node and from there over the reset transistor onto the $V_{dd}$ drain. Instead, this high level of photogenerated charge spills onto adjacent photodiodes and results in a large white spot on the image (i.e. "blooming").

If the potential on the transfer gate is held positive, on the other hand, there is an easy path through the transfer transistor and to the $V_{dd}$ drain, since the transfer transistor is partially on. However, in this state, the well capacity of the photodiode is reduced.

DETAILED DESCRIPTION

In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in order to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
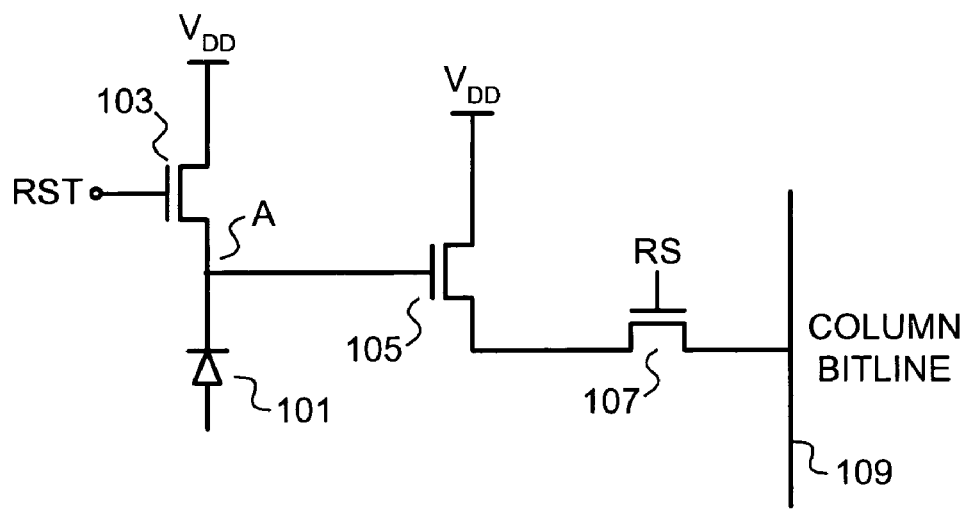
FIG. 1 is a schematic drawing of a three transistor (3T) active pixel.

FIG. 1 illustrates a CMOS active pixel that uses three transistors. This is known in the art as a 3T active pixel. A light sensing element 101 outputs a signal that is used to modulate an amplification transistor 105. The signal is "placed" at node A which is connected to the gate of the amplification transistor 105. Thus, the amplification transistor 105 is in source-follower configuration. The light-sensing element 101 can be one of a variety of devices, including without limitation, photogates, photodiodes, pinned photodiodes, partially pinned photodiodes, etc.

During an integration period (also referred to as an exposure or accumulation period), the light-sensing element 101 captures light that is incident onto the pixel and outputs a signal indicative of the amount of light incident on that light-sensing element 101. The signal (which is an accumulation of charge generated by the light sensing element 101) is stored on node A which is connected to the gate of the amplification transistor 105. The signal stored on node A is then used to modulate the amplification transistor 105. After the integration period, a reset transistor 103 is used to reset the level of the node A to a reference level prior to the start of the next integration period. Finally, a row select transistor 107 is used as a means to address the pixel and to selectively read out the signal onto a column bit line 109.

Figure 2:
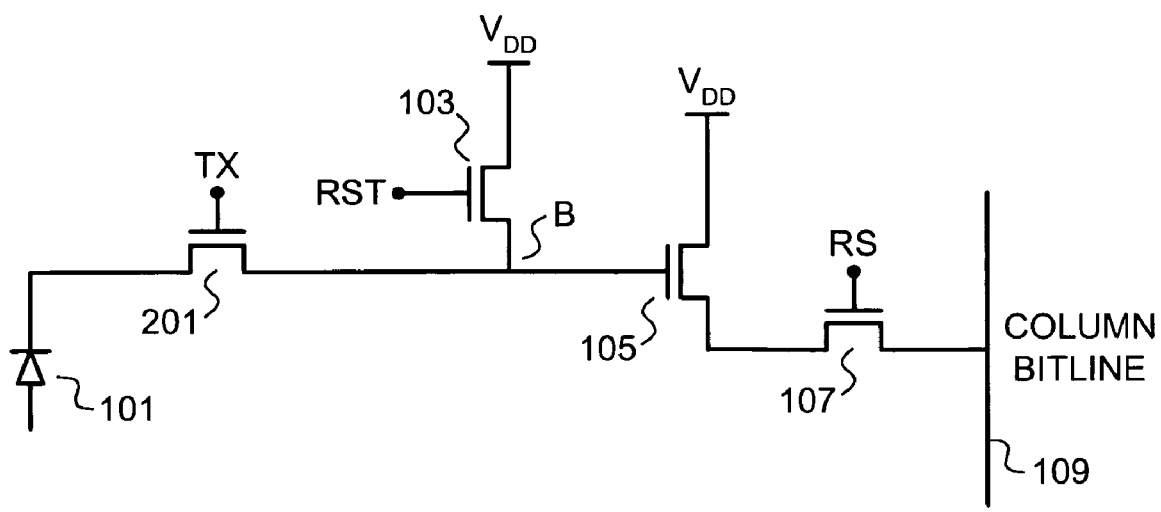
FIG. 2 is a schematic diagram of a four transistor (4T) active pixel.

FIG. 2 is similar in many respects to the 3T active pixel of FIG. 1, except that an additional transfer transistor 201 is used to transfer the signal output by the light-sensing element 101 to a floating node B. This design is known as a four transistor or 4T pixel. In operation, during the integration period, the light sensing element 101 generates charge which is held at the light sensing element because transfer transistor 201 is off. After the integration period, the transfer transistor 201 is turned on (using the transfer gate) to transfer the signal to the floating node B. After the signal has been transferred to floating node B, the transfer transistor 201 is turned off again for the start of a subsequent integration period. Thus, as seen, the transfer transistor 201 turns on and off periodically to transfer signal from each integration period to the floating node B.

The signal on the floating node B is then used to modulate the amplification transistor 105. Further, after readout through the column bitline 109, the reset transistor 103 resets the floating node B to a reference voltage, in this particular embodiment, $V_{dd}$.

The present invention is equally applicable to either of the 3T or 4T designs described above, as well as the 5T, 6T, and other designs used by solid state image sensors. Specifically, the present invention contemplates that there are two modes of operation for the pixel (and thus the image sensor). Under low light conditions, the voltage on the transfer gate (in the case of a 4T, 5T, 6T and any other pixel designs that use a transfer gate) is held slightly positive. Under normal light conditions, the pixel operates normally with the voltage on the transfer gate nominally at about 0.0 volts. Similarly, for the 3T pixel, under low light conditions, the voltage on the reset gate of the reset transistor 103 is held slightly positive. Under normal light conditions, the pixel operates normally with the voltage on the reset gate nominally at 0.0 volts.

The structure of an active pixel formed in accordance with the present invention is substantially the same as that shown in FIGS. 1 or 2. However, as further detailed below, the operation of the image sensor and the active pixels within the image sensor is controlled such that the pixels behave differently based upon different light conditions.

Figure 3:
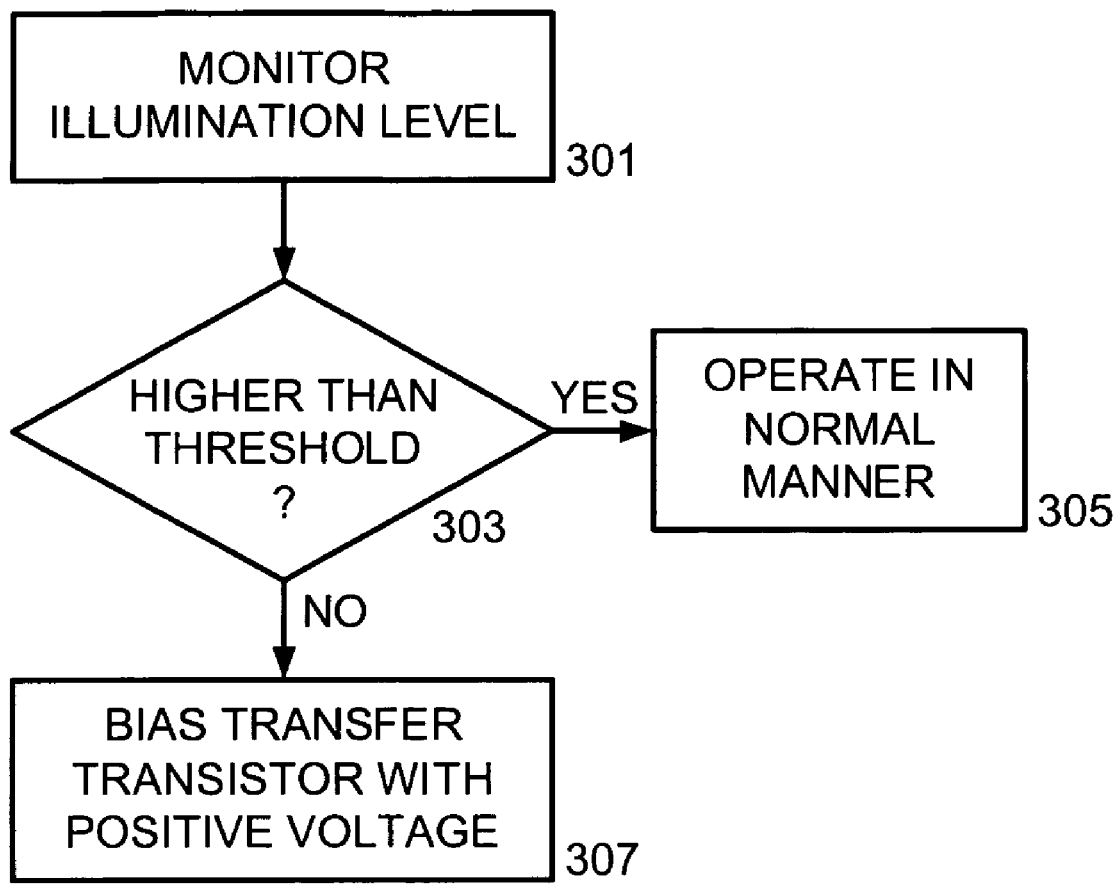
FIG. 3 is a flow diagram illustrating the method of operation of the 4T active pixel of FIG. 2.

Turning to FIG. 3, a flow diagram showing a method of the present invention is provided. First, at box 301, the illumination level incident to the image sensor (and thus pixels) is monitored. This can be done in any number of conventional ways. For example, the output from the image sensor can be examined for its brightness level. As can be appreciated of ordinary skill in the art, nearly every image sensor has circuitry for automatic gain control and exposure control. By determining the strength of the signal output from the pixels, the ambient light level can be determined. Alternatively, the processed output from the image sensor can be examined to determine the relative ambient lighting conditions. Still alternatively, a dedicated light-sensitive device outside of the imaging area of the image sensor can be used to monitor the amount of incident light onto the image sensor.

Next, at box 303, the illumination level determined at box 301 is compared to a threshold value, such as in one embodiment by the use of a comparator circuit. The threshold value is the trigger for transition between "normal" operation and "low light" operation. The precise point where the threshold is set may be made variable depending upon design considerations, parameters, and characteristics of the image sensor, and may even be adjustable at the discretion of the user of the image sensor. In any event, in one embodiment, a threshold is used to delineate between normal and low light operation. It can be appreciated that other types of triggers may be used to transition from normal and low light operation. The precise mechanism used to transition from normal to low light operation is not critical.

If the illumination level determined at box 301 is lower than the threshold, then at box 307, the transfer transistor (or reset transistor in the case of a 3T pixel) is positively biased to some level $V_{tx\_lo\_dark}$ during the integration period. In one embodiment, $V_{tx\_lo\_dark}$ is 0.5 volts. However, the exact value of $V_{tx\_lo\_dark}$ will vary with the particular process (e.g. 90 nm CMOS) used to manufacture the image sensor and may vary from just above 0.0 volts and just under full turn on of the transistor.

Figure 6:
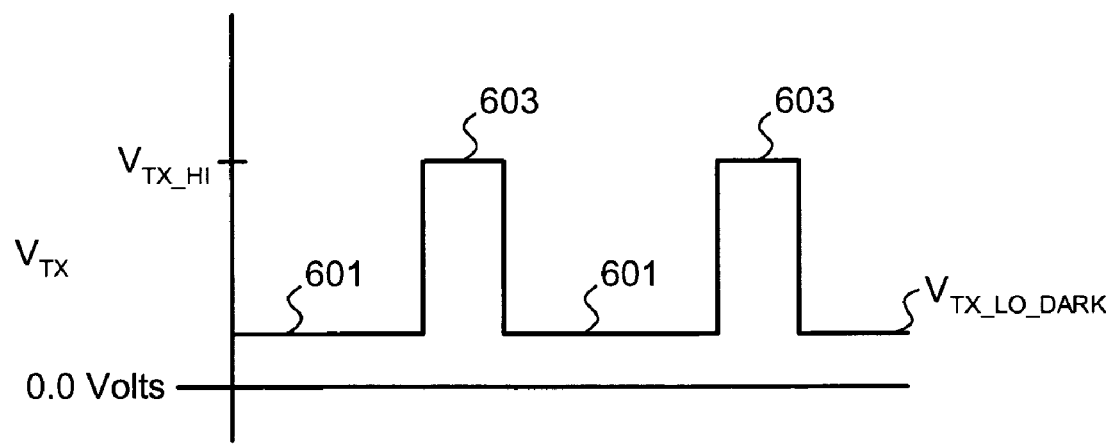
FIG. 6 is a timing diagram for a transfer transistor (4T pixel) or reset transistor (3T pixel) operating in low light conditions.

In the case of a 4T pixel, during the readout period that transfers the photodiode signal to the floating node, the transfer transistor is biased to $V_{tx\_hi}$, which will fully turn on the transfer transistor. In some embodiments, $V_{tx\_hi}$ may be 1.3 volts, 1.8 volts, 2.3 volts, 2.8 volts, or 3.3 volts. In other words, $V_{tx\_hi}$ is the turn on voltage of the transistors in the integrated circuit and the precise voltage will vary with the particular integrated circuit. Typically, $V_{tx\_hi}$ is simply the $V_{dd}$ power supply rail for the integrated circuit. In other embodiments, $V_{tx\_hi}$ may even be higher than the $V_{dd}$ power supply rail if a bootstrapping or charge pump circuit is used. FIG. 6 illustrates an example of the control timing for the transfer transistor. Specifically, during an integration period 601, the transfer transistor is held at $V_{tx\_lo\_dark}$. Then, during the readout periods 603, the transfer transistor is biased to $V_{tx\_hi}$. Note that in the case of a 3T pixel, the above described timing is applied to the reset transistor 103.

However, if the illumination level is higher than the threshold, then at box 305, the pixels operate normally with $V_{tx\_lo\_norm}$ at or near 0.0 volts. Thus, the transfer transistor (or reset transistor in the case of a 3T pixel) is held at $V_{tx\_lo\_norm}$ during the integration period. In one embodiment, $V_{tx\_lo\_norm}$ is 0.0 volts.

Figure 5:
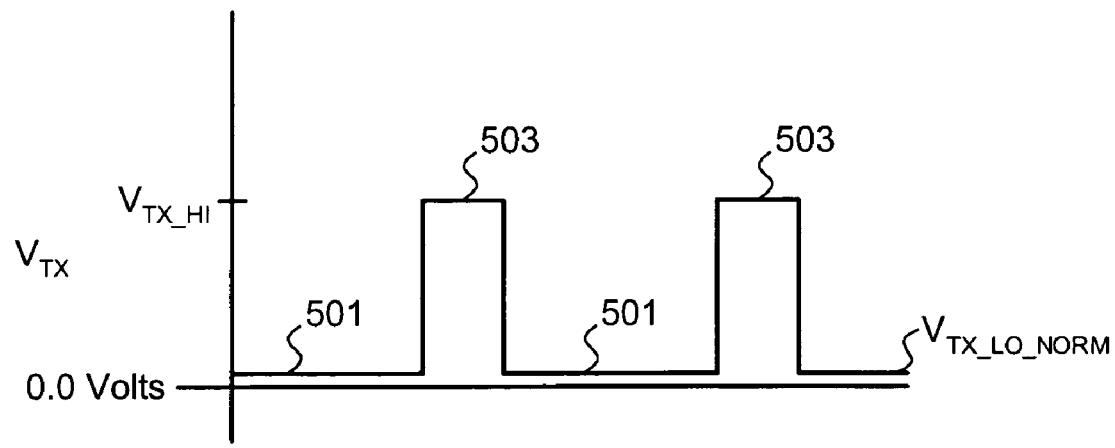
FIG. 5 is a timing diagram for a transfer transistor (4T pixel) or reset transistor (3T pixel) operating in normal light conditions.

In the case of a 4T pixel, during the readout period that transfers the photodiode signal to the floating node, the transfer transistor is biased to $V_{tx\_hi}$, which will fully turn on the transfer transistor. FIG. 5 illustrates an example of the timing for the transfer transistor. Specifically, during an integration period 501, the transfer transistor is held at $V_{tx\_lo\_norm}$. Then, during the readout periods 503, the transfer transistor is biased to $V_{tx\_hi}$. Note that in the case of a 3T pixel, the above described timing is applied to the reset transistor 103.

Furthermore, it can be appreciated that the precise values of $V_{tx\_lo\_dark}$, $V_{tx\_lo\_norm}$, and $V_{tx\_hi}$ may vary with the particular device and system characteristics, as well as with the process used to manufacture the image sensor. However, $V_{tx\_lo\_dark}$ is typically greater than $V_{tx\_lo\_norm}$.

To understand why the above timing and voltage bias combinations are advantageous, further analysis of the operation of the pixel is provided. Specifically, if the ambient lighting is normal (or non-low light), the gain of the image sensor typically remains at 1.0. Under these conditions, dark current and hot pixel generation is not a significant issue since the integration periods are relatively short.

However, in low light conditions where the image sensor gain is increased, for example to 1.5, blooming is improved since the transfer transistor or reset transistor (for 3T pixels) is partially on. Moreover, the full well capacity is not degraded since the gain is greater than 1.0 and the image sensor does not use the full well capacity of the photodiode. For example, if the gain is 2.0, then the image sensor can only effectively use half of the full well capacity of the photodiode due to signal swing limitations at the higher gain. Thus, the fact that the transfer transistor or reset transistor (for 3T pixels) is partially "on" during integration at gains greater than 1.0 does not degrade the signal to noise ratio of the image sensor.

Dark current and hot pixel defect density is also improved. It has been found that the increased generation of electrons under the transfer gate as a result of the positive bias during low light conditions results in better performance. Because the transfer transistor or reset transistor (3T pixels) is "on", the generated charge under the transfer gate flows to the floating node. As part of the readout timing, the floating node is reset and all of this generated charge is swept to the $V_{dd}$ through the reset transistor 103 when the reset transistor 103 is turned on to reset the floating node potential. In this manner, dark current and hot pixel defect density is improved. In the case of a 3T pixel, the reset transistor is partially on which allows the generated electron charge to go out to $V_{dd}$.

Thus, as seen from the description above, a pixel and image sensor formed in accordance with the present invention has two modes of operation: a normal mode and a low light mode. The present invention switches from a normal to a low light mode based upon the amount of illumination on the image sensor. The amount of illumination on the image sensor can be determined in a variety of ways, and any method for determining the level of illumination could easily be applied to the present invention. Once the level of illumination is determined, a decision is made by comparing the level of illumination to a threshold whether to operate in normal mode or low light mode. In low light mode, the reset transistor (for a 3T pixel) or the transfer transistor (for a 4T pixel) is biased positive.

Figure 4:
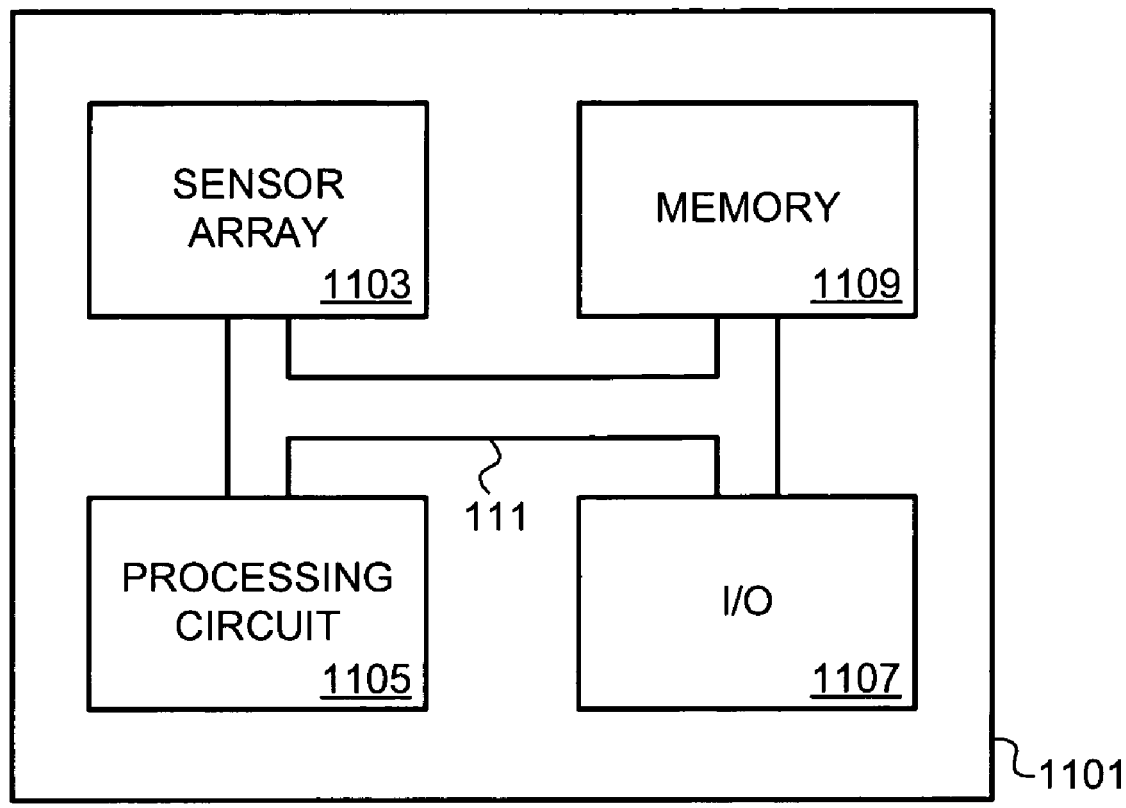
FIG. 4 shows an image sensor formed using the active pixels and methods of the present invention.

The active pixels described above may be used in a sensor array of a CMOS image sensor 1101. Specifically, FIG. 4 shows a CMOS image sensor formed in accordance with the present invention. The CMOS image sensor includes a sensor array 1103, a processor circuit 1105, an input/output (I/O) 1107, memory 1109, and bus 1111. Preferably, each of these components is formed on a single silicon substrate and manufactured to be integrated onto a single chip using standard CMOS processes.

The sensor array 1103 portion may be, for example, substantially similar to the sensor arrays portions of image sensors manufactured by the assignee of the present invention, OmniVision Technologies, Inc., of Sunnyvale, Calif., as model numbers OV5610 or OV7640, except that the pixels are replaced with the active pixels disclosed herein.

The description of the invention in this application as set forth herein is illustrative and is not intended to limit the scope of the invention. Variations and modifications of the embodiments described herein are possible, and practical alternatives to, or equivalents of the various elements, the embodiments are known to those of ordinary skill in the art. These and other variations and modifications of the embodiments disclosed herein may be made without departing from the scope and spirit of the invention.

From the foregoing, it will be appreciated that specific embodiments of the invention have been described herein for purposes of illustration, but that various modifications may be made without deviating from the spirit and scope of the invention. For example, the teachings of the present invention can be applied to a 5T, 6T, 7T, or other types of pixel architectures. Accordingly, the invention is not limited except as by the appended claims.

I claim:

1. An active pixel comprising:
   a light sensing element formed in a semiconductor substrate; and
   a transfer transistor formed between said light sensing element and a floating node and selectively operative to transfer a signal from said light sensing element to said floating node, wherein said transfer transistor is positively biased such that said transfer transistor is partially turned on for the entire duration of an integration period and fully turned on for the entire duration of a readout period during a first mode of operation.

2. The pixel of claim 1 wherein said light sensing element is selected from the group of photodiode, pinned photodiode, partially pinned photodiode, or photogate.

3. The pixel of claim 1 further wherein said transfer transistor is turned off for the entire duration of said integration period during a second mode of operation.

4. The pixel of claim 1 wherein said first mode of operation is used if a level of incident light is low.

5. The pixel of claim 3 wherein said second mode of operation is used if a level of incident light is normal.

6. The pixel of claim 1 further including an amplification transistor controlled by said floating node, wherein said amplification transistor outputs an amplified version of said signal to a column bitline.

7. The pixel of claim 1 further including a reset transistor operative to reset said floating node to a reference voltage.

8. The pixel of claim 1 wherein said pixel is integrated into a CMOS image sensor.

9. The pixel of claim 1 wherein said pixel is part of a 4T, 5T, 6T, or 7T pixel architecture.

10. A method of operating a pixel of an image sensor, said pixel including a light sensing element, a transfer transistor between said light sensing element and a floating node for transferring a signal from said light sensing element to said floating node, and an amplification transistor modulated by said signal on said floating node, the method comprising:
    determining a level of incident light;
    if said level of illumination is low:
        partially turning on said transfer transistor for the entire duration of an integration period; and
    if said level of illumination is normal:
        turning off said transfer transistor for the entire duration of said integration period.

11. The method of claim 10 wherein said light sensing element is selected from the group of photodiode, pinned photodiode, partially pinned photodiode, or photogate.

12. The method of claim 10 wherein said amplification transistor outputs an amplified version of said signal to a column bitline.

13. The method of claim 10 wherein said pixel further includes a reset transistor operative to reset said floating node to a reference voltage.

* * * * *